United States Patent [19]

Bennion et al.

[11] Patent Number: 4,838,634
[45] Date of Patent: Jun. 13, 1989

[54] ORGANIC OPTICAL WAVEGUIDES AND METHOD OF FABRICATING WAVEGUIDE STRUCTURES

[75] Inventors: Ian Bennion, Ravensthorpe, United Kingdom; Clive Trundle, Silverstone, England; Jack Brettle, Towcester, England; Martin J. Goodwin, Northampton, Great Britain; Robert Glenn, Kingsthorpe, England

[73] Assignee: The Plessey Company plc, United Kingdom

[21] Appl. No.: 141,665

[22] PCT Filed: Apr. 24, 1987

[86] PCT No.: PCT/GB87/00275

§ 371 Date: Dec. 28, 1987

§ 102(e) Date: Dec. 28, 1987

[87] PCT Pub. No.: WO87/06715

PCT Pub. Date: Nov. 5, 1987

[30] Foreign Application Priority Data

Apr. 25, 1986 [GB] United Kingdom ............... 86/10227

[51] Int. Cl.⁴ ............................................. G02B 6/10
[52] U.S. Cl. .................................. 350/96.12; 264/1.1; 350/96.29; 350/96.34; 427/164; 427/322
[58] Field of Search .............. 350/96.11, 96.12, 96.15, 350/96.29, 96.34; 264/1.5, 1.1; 427/162, 163, 164, 169, 256, 282, 322, 400

[56] References Cited

U.S. PATENT DOCUMENTS 3,809,732 5/1974 Chandross et al. ........... 350/96.12 X
3,953,620 4/1976 Chandross et al. ........... 350/96.12 X
3,955,015 5/1976 Ohtsuka et al. ..................... 427/163
4,431,263 2/1984 Garito .............................. 350/96.34
4,749,245 6/1988 Kawatsuki et al. .............. 350/96.12

FOREIGN PATENT DOCUMENTS 54-119939 9/1979 Japan ................................ 350/96.34
59-220704 12/1984 Japan .
1362757 8/1974 United Kingdom .
2102145 1/1983 United Kingdom .

OTHER PUBLICATIONS

Nomura et al, "Fiber Optic Sheets of Ridged Polymer Films," *Applied Optics*, vol. 14, No. 3, Mar. 1975, pp. 586–588.
Kato et al, "Polymer Thin Film Optical Waveguide," *Electronics & Commun. in Japan*, vol. 65, No. 11, Nov. 1982, pp. 101–107.
Tomaru et al, "Organic Crystals Growth for Optical Channel Waveguides," *Optics Commun.*, vol. 50, No. 3, Jun. 1984, pp. 154–156.

*Primary Examiner*—John D. Lee
*Attorney, Agent, or Firm*—Sughrue, Mion, Zinn, Macpeak, and Seas

[57] ABSTRACT

An optical waveguide and method of fabricating waveguide structures is disclosed. More specifically, a method of producing an organic waveguide which comprises treating a transparent plastic substrate with a solution in a inert solvent of an organic dopant which is absorbed into the surface of the substrate, under conditions such that a surface layer is formed having a refractive index which is greater than that of the substrate. Said dopant has a higher affinity for the plastic's substrate than for the solvent.

19 Claims, 2 Drawing Sheets

ORGANIC OPTICAL WAVEGUIDES AND METHOD OF FABRICATING WAVEGUIDE STRUCTURES

FIELD OF THE INVENTION

This invention relates to optical waveguides and includes a method of fabricating waveguide structures.

BACKGROUND OF THE INVENTION

In principle, optical waveguides comprise a thin film or layer of material supported on a substrate of lower refractive index. A ray of light may be propagated within the thin film of higher refractive index material. The ray is confined by total internal reflection at the thin film/substrate interface and at the film/air space boundary. Waveguides are also used for roles additional to merely guiding light. For example, by combining the waveguide with a non-linear element, structures can be produced which are useful in optical logic and signal processing application.

Traditionally, waveguides have been constructed from inorganic materials such as glasses which may be doped with inorganic materials, such as metal or semiconductor compounds. In order to produce a device which combines waveguiding and non-linear optical properties, it has generally been the practice to grow a single crystal layer onto a suitable base substrate. Such techniques are laborious and complex.

In contrast, the use of organic materials for waveguide construction has been considered to suffer from disadvantages such as lack of stability, insufficient purity, poor optical properties and the difficulty of controlling the incorporation of dopant materials.

SUMMARY OF THE INVENTION

According to the present invention there is provided a method of producing an organic waveguide which comprises treating a transparent plastics substrate with a solution in an inert solvent of an organic dopant which is absorbed into the surface of the substrate, under conditions such that a surface layer is formed having a refractive index which is greater than that of the substrate.

The process of the present invention enables a polymer substrate having the necessary optical properties, (including transparency, clarity and good surface properties), to be doped with a sufficient amount of a suitable organic compound to produce a local change in the refractive index of a surface region of the polymer. Provided that the resultant refractive index of the surface layer is greater than that of the bulk polymer, the resulting structures can be used as a waveguide. Moreover, by selecting organic dopant compunds which possess non-linear optical properties, a non-linear waveguide can be produced in a single production step.

Figure 1:
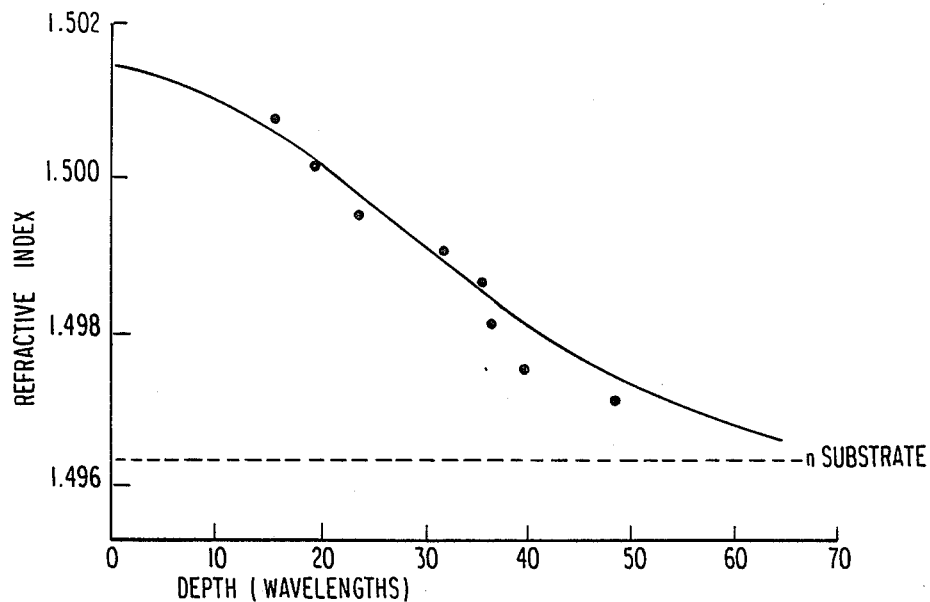
FIG. 1 shows a refractive index/depth (wavelengths) relationship and shows a typical profile for C1NA

In essence, the process of the present invention, which we have termed "solvent-assisted indiffusion" or (SAID), involves the contacting of the polymer substrate in a two-phase system comprising the organic dopant and a saturated solution of the dopant. The solvent acts as a transfer medium which allows dopant molecules to come into contact with the surface of the substrate at a constant rate while at the same time giving an even distribution over the substrate. Presence of solid dopant suspended in the solution ensures a constantly saturated solution and steady state conditions. Dopant molecules reaching the surface of the substrate face a choice between continued solvation and entry into the substrate to form a solid solution. Molecules which do enter the surface may then diffuse further into the matrix. Ideally, a large dopant concentration should be achieved near the surface but not penetrate far into the bulk polymer. This would give an effective waveguide with good non-linear properties (depending on the nature of the organic dopant), but would avoid the creation of a thick waveguide supporting many modes.

In effect, a surface layer is formed in the polymer matrix forming the substrate which is doped with the organic compound to such an extent that there is a local increase in refractive index in the thickness of the doped layer. The technique of introducing a dopant into a polymer matrix by imbibition from a solution in an inert solvent can be controlled to enable the degree of change in refractive index and the depth of penetration of the organic compound to be varied. The main factors which determine these features of the resulting waveguide are: (a) the nature of the organic compound and of the solvent, (b) the solution concentraton, (c) the treatment time, (d) the type of polymer matrix and the relative affinity of the dopant for the solvent and the polymer matrix, (e) the temperature of treatment, (f) the nature of any pretreatment and (g) the presence of other substances, such as surfactants, in the solution which assist the absorption of the organic dopant into the matrix. In general, organic compounds which have a higher affinity for the polymer matrix will be imbibed more quickly and to a greater depth in the substrate. Higher temperatures, higher concentration and longer treatment times all contribute to a greater degree of penetration of the compound into the polymer matrix.

In practice, the plastics substrate is normally immersed in a saturated solution of the dopant. A vessel is charged with a sufficient amount of solution to cover the substrate and heated with stirring to the required temperature. A condenser may be necessary if the temperature used is likely to cause excessive solvent evaportaion. The temperature is best maintained by means of a thermostatted bath or by reflux of the solvent. Sufficient dopant is added to give a saturated solution with a small excess and the system allowed to equilibrate. The substrate is immersed in the solution for the required time. Provided the solution is stirred solid dopant particles in suspension do not normally affect the process, but if the dopant is molten at the temperature used, care must be taken that the substrate is not wetted directly by dopant droplets; otherwise an uneven indiffusion is obtained. Usually, swirling will cause any droplets to adhere to the sides of the vessel: the substrate may then be introduced. Where uneven indiffusion does occur because of particles sticking to the substrate surface, the cause is often static electricity. Pretreatment of the substrate before immersion with an anti-static gun is normally effective in overcoming this problem. After immersion, the substrate may be cooled, washed and dried.

In general, the waveguides produced exhibit low loss, good surfaces, little scatter (due to the diffuse nature of the edge of the dopant boundary) and may support one or more modes depending on the depth to which the dopant is diffused.

CHOICE OF SUBSTRATE

In view of the intended purpose of producing a waveguide it is necessary to use a substrate polymer which has a good optical properties. Clear, amorphous polymers of good thermal and optical stability are called for, preferably with hard surfaces which can be polished to a flat surface.

The polymer substrate may be selected from any polymers which have good optical properties and into which the dopant may be diffused. Examples of polymers which may be selected are polycarbonates, polyesters, polystyrene, vinylidene difluoride polymers and polyalkyl acrylates and methacrylates.

The polymer material which is currently preferred is CR 39, poly diethylene glycol bis (allyl carbonate), which is obtainable from P.P.G. Limited as a curable polymer. CR 39 has shown the greatest uptake of the dopant materials so far tested. This may be partly explained by the fact that when cured, CR 39 is a cross-linked polymer having a loosely packed network of polymer chains allowing more space for the entry of dopant molecules. Preparation of optically clear flat sheets in CR 39 polymer is described in U.S. Pat. No., 2,542,386.

Other factors which influence the choice of the polymer include the ability of the polymer to be cut and polished. In general, cross-linkable polymers such as CR 39, can be polished to provide satisfactory thin flat substrates.

Polymers which can be shaped, e.g. by extrusion or by moulding or casting are also advantageous. Thus, for example, polyvinylidene difluoride and copolymers of vinylidene difluoride with trifluoroethylene can be extruded or moulded and also cast from solution in common solvents, such as acetone and dimethylformamide. Vinylidene difluoride polymers exhibit piezoelectric and pyroelectric properties when films of the material are poled (see British Pat. No. 1,589,786). These properties can be of value in connection with alignment of dopant materials as described subsequently herein.

Another factor which should be taken into account in selecting the polymer material is its behaviour in contact with the solvent. Polymers which are dissolved or swelled excessively so as to cause distortion in the substrate are to be avoided.

CHOICE OF DOPANT

The dopant selected should primarily be capable, on diffusion into the polymer substrate, of raising the refractive index. In general, we prefer dopants which exhibit intrinsic non-linearity.

Advantageously, the dopants are selected from organic compounds with high values of quadratic or cubic hyperpolarisability. A large value for quadratic or hyperpolarisability, which generally implies a corresponding high value for cubic hyperpolarisability, is easily measured (see Schmidt et al Appl. Phys. Lett. 25, 458 (1974).

The organic dopants which are most effective tend to be compounds having large dipole moments. For example, the dopants may be selected from aryl compounds having amino, nitro, hydroxy and/or alkoxy substituents, such as anilines and aniline derivatives. Specific examples of this class of compounds are, m-nitroaniline (mNA), o-nitroaniline (oNA), 2-chloro-4-nitroaniline (C1NA) and 1-dimethylamino-2-acetamido-4-nitrobenzene (DAN).

Dopants may also be selected from compounds having a heterocyclic nitrogen-containing ring, such as pyrazoline derivatives, and from compounds being extended conjugated systems extending between dipoles, such as azo dyes.

The book entitled "Non-linear optical properties of organic and polymer materials" edited by D. J. Williams and published 1983 by the American Chemical Society as No.233 in the A.C.S. Symposium series may be consulted for additional examples of compounds and polymers which exhibit non-linear optical properties. Chapter 3 of this book written by Robert J. Twieg and Kauti Jain may be consulted for further examples of compounds which exhibit high beta values.

CHOICE OF SOLVENT

The function of the solvent used in the process of this invention is to act essentially as a transport medium. It should be inert and should not dissolve or swell the substrate significantly. Although the dopant must be soluble in the solvent in order to make transferance possible, the solubility product should be small. There are two reasons for this. First, transfer of the dopant from the solvent to the substrate depends upon its relative solubility in the solvent and polymer. A low affinity for the solvent coupled with a high affinity for the polymer substrate should encourage dopant molecules at the interface to enter the substrate. Secondly, a high solubility in the solvent and polymer. A low affinity for the solvent coupled with a high affinity for the polymer substrate should encourage dopant molecules at the interface to enter the substrate. Secondly, a high solubility in the solvent would mean that a large amount of dopant would be taken up, whereas a low solubility means that a saturated solution may be maintained with only a little dopant.

A high-boiling solvent is also desirable, both for high temperature diffusion of the dopant, and for operation at low temperature (where vapour loss is minimised).

It has been found that perfluorinated organic solvents are advantageous solvents in the process of the invention. Most organic compounds are sparingly soluble in these solvents at elevated temperatures and a wide range of such solvents is available. They are inert, non-flammable and non-toxic and are commercially available from 3M Corporation (FC range of perfluorinated solvents) and from ISC Chemicals Ltd. (PP range).

The following Exampls will illustrate the process of the present invention:

EXAMPLES

A piece of cured CR 39 sheet materials about 1 mm thick was immersed in saturated solution of m-nitroaniline (mNA) in a perfluorinated hydrocarbon sold by 3M Corporation under the trade name FC 72. The CR 39 sample was refluxed (56° C.) in the solution for 10 minutes. After removal and drying, the optical properties of the resulting waveguides was tested, light being coupled into the waveguide by prism coupling.

Similar pieces of cured CR 39 sheet were treated with 1-dimethyl-2-acetamido-4-nitrobenzene (DAN), orthonitroaniline (o-NA) and 2-chloro-4-nitroaniline (C1NA). The process parameters, depth of diffusion and number of modes is shown in Table 1 below:

TABLE 1

| Material (see text) | Solvent* | Temperature C | Immersion time s | Surface Δ n | Number of modes |
|---|---|---|---|---|---|
| DAN | FC40 | 155 | 15 | 0.001 | 2 |
| oNA | FC40 | 155 | 15 | 0.01 | 5 |
| ClNA | FC40 | 155 | 30 | 0.006 | 8 |
| mNA | FC72 | 56 | 600 | 0.005 | 2 |

*FC series, 3M Corporation
Measured at 633 nm wavelength

Concentration refractive index profiling was achieved by an optical method, determining the refractive index profile from measurements of the mode propagation constants. A typical profile (for C1NA) is shown in FIG. 1, and was determined at 633 nm using the method described by J. M. White and P. F. Heidrich, Appl. Opt. 1976, 15, pp 151-155. Waveguiding quality was good with losses of only a few dBcm$^{-1}$. Depths of a few microns were used, with surface refractive index changes of 0.001 to 0.01 with respect to the undoped substrate.

Figure 2:
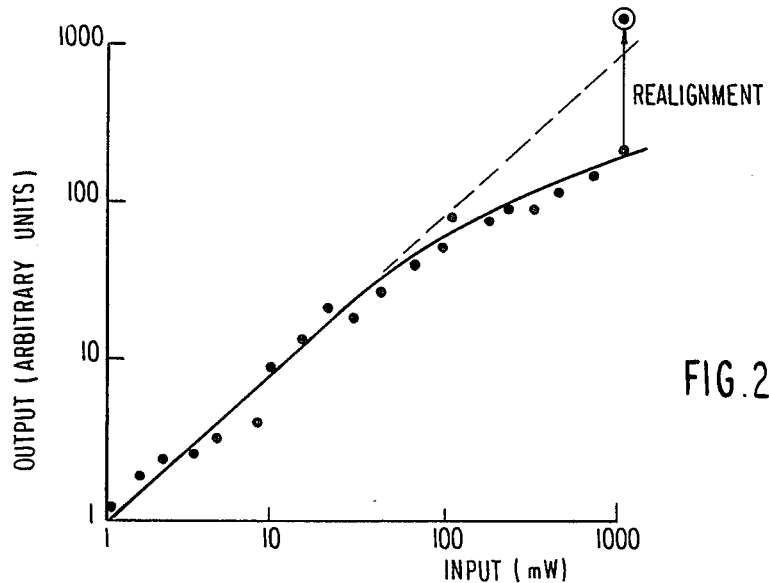
FIG. 2 shows an output/input relationship. The response of a DAN waveguide is shown.

Non-linearity was investigated using an argon laser at 514.4 nm. The response of a DAN waveguide is shown in FIG. 2; there was a reduction in coupling efficiency as input light intensity was increased. This was recoverable by realignment of the beam, as shown for the highest intensity. These results give an exceptionally large intensity-dependent index of $\sim 0.5$ (MWcm$^{-2}$)$^{-1}$, which was confirmed by experiments with DAN samples mounted in a Fabry-Perot cavity. These experiments revealed an associated time constant of $\sim 2$ ms, which implies a thermal origin, unrelated to any electronic $\chi^3$ effect. An almost identical response was obtained with m-NA waveguides.

Figure 3:
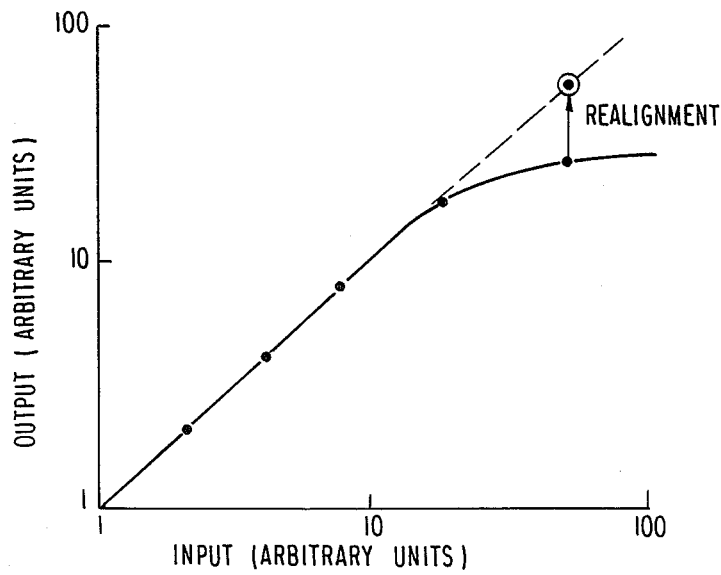
FIG. 3 shows an output/input result obtained with an o-NA waveguide.

Similar experiments were carried out using the pulsed output from a passively Q-switched Nd:YAG laser of 1.06 μm wavelength. FIG. 3 shows the result obtained with an o-NA waveguide, similar to that described above but with a much lower non-linear coefficient of refractive index of $\sim 10^{-7}$ (MWcm$^{-2}$)$^{-1}$, and a much faster response time, comparable with the laser pulse rise time of 5 ns.

Figure 4A:
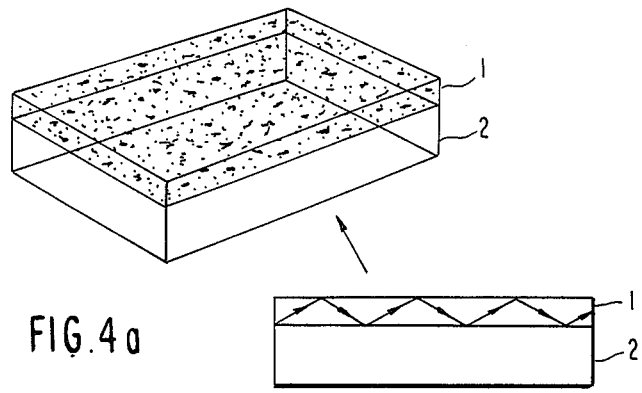
FIG. 4(a) shows a planer waveguide, 4(b) shows a curved stripe waveguide and 4(c) shows a Y-junction broadening stripe waveguide.
Figure 4B:
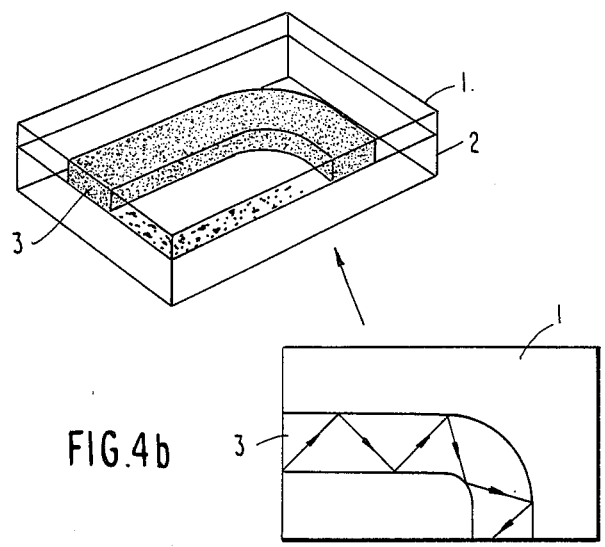
Figure 4C:
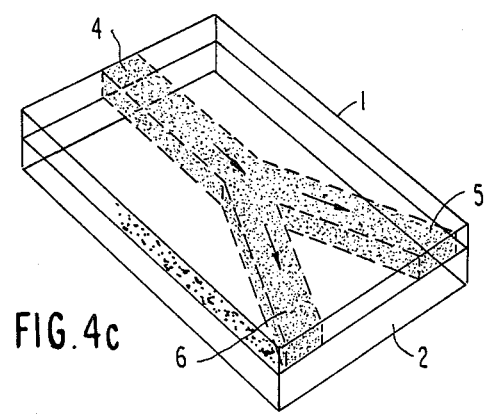

Using the technique described in the above Examples, more complicated waveguide structures can be formed by predefining a mask on the surface of the matrix material by standard photolithographic processes. Apertures defined in this mask enable selected areas of the surface of the matrix material to be solvent indiffused, resulting in channel waveguide structures. A wide variety of active and passive channel waveguide structures can be formed by this technique, including curved waveguides, branching waveguides, directional couplers and interferometers. Typical waveguide structures are illustrated in Figures 4(a), (b) and (c) and in the paper by Bennion et al published in the Radio & Electronic Engineer, volume 53, No. 9, pp 313-320, September 1983. FIG. 4(a) shows a planar waveguide, 4(b) a curved stripe waveguide and 4(c) a Y-junction broadening stripe waveguide. In FIG. 4(a), a plastics substrate 2 has a waveguiding surface layer 1 formed by solvent indiffusion of a dopant which raises the refractive index within the layer 1. The waveguide shown in FIG. 4(b) has been formed with a 'J' shaped waveguide channel by confining the solvent indiffusion to the area 3. FIG. 4(c) shows a 'Y' shaped channel waveguide structure formed by similarly restricting the solvent indiffusion dopant to a defined pattern in the surface layer 1. Thus in the waveguide of FIG. 4(c), for example, light directed along channel 4 will divide into two paths 5 and 6. The Bennion et al article described basic principles of the fabrication and use of organic optical waveguides.

Although the process of the present invention has been illustrated above with particular reference to the indiffusion of nitroanilines, other organic dopants may be used, especially compounds having extensively delocalised π-electron systems. Dipolar organic compounds having extended conjugated systems tend to display greater non-linear optical effects. They also tend to diffuse less within the substrate and therefore form more stable waveguide structures. For example, a number of ortho-nitro, ortho-cyano-phenyl, and ortho-methoxy pyrazolines have been investigated and shown to solvent indiffuse with CR 39 plastics to form waveguides. The following specific pyrazoline derivatives have been successfully incorporated into CR 39 plastic using perfluorinated hydrocarbon solvents.

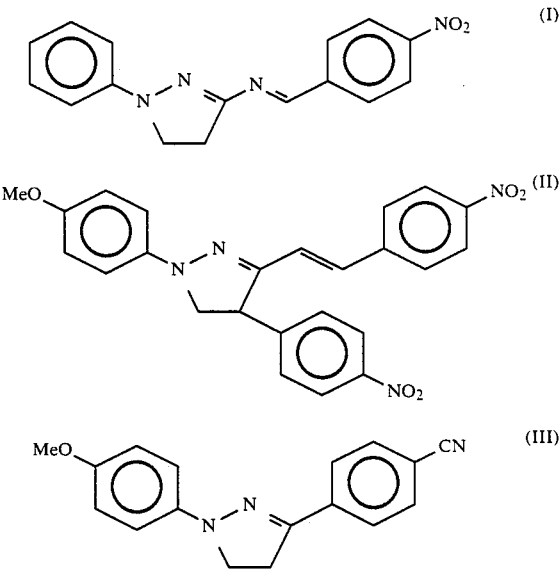

One specific application of channel waveguide structures of this kind is to provide optical interconnections between semiconductor components as described, for example in our British Patent Application No. 85 05363 (Publication No. 2155194).

Multilayer waveguide structures can also be fabricated, e.g. by depositing one or more layers of polymer material onto the original substrate and subjecting the structure (after curing if necessary) to solvent indiffusion treatment prior to depositing the subsequent layer of polymer. Spin-coating or dip-coating techniques are suitable procedures for depositing two or more superposed layers of polymer matrix.

As indicated above, channel waveguide structure can be produced by standard photolithoghoic methods to define desired patterns on the plastics substrate. Such methods have been used to define windows of the order of 3 to 7 μm in a metallic mask (e.g. aluminum) evaporated onto the plastics substrate. Solvent indiffusion into the substrate followed by removal of the aluminum left well-defined channel waveguides. Metallic layers deposited onto the plastics substrate by photolithography or other standard techniques need not be removed after solvent indiffusion but can be used as a means for applying an electrical field to the indiffused dopant causing alignment of polar dopant molecules.

This last-mentioned technique is particularly valuable in the production of optically non-linear waveguide structures which make use of the large second and third order susceptibilities and intensity dependent refractive indices of many organic molecules. Waveguides fabricated with such organic molecules will be capable of performing a wide range of non-linear functions. They can take the form of the planar structures and the numerous channel waveguide structures, described above, as well as multilayer and distributed feedback structures.

Organic, non-linear waveguide devices formed by solvent indiffusion can perform a wide range of high speed optical signal processing functions including optical bistability, logic gating, inversion, optical limiting, pulse shaping, correlation and convolution by degenerate four-wave mixing, phase cnjugation, harmonic generation, frequency mixing, frequency shifting and high speed all optical switching. Devices performing these functions will have widespread applicability in the fields of optical computing, signal processing and high data rate optical communications systems. Details of construction and operation of optical switching devices can be found in the review paper of G. I. Stigerman and C. T. Seaton published in Journal Appl. Phys. 58, R57 (1985).

We claim:

1. An organic channel waveguide which comprises a transparent, cured polymer substrate having surface portions defining one or more channels in a surface layer thereof, said one or more channels having a higher refractive index than that of the bulk polymer substrate and being formed by diffusing an organic dopant into predetermined areas of said surface layer, said organic dopant having intrinsically non-linear optical properties.

2. An organic waveguide which comprises a transparent cured polymer substrate having a doped surface layer having a refractive index which differs from that of the bulk polymer substrate and contains an organic dopant having intrinsically non-linear optical properties, said dopant having been solvent-indiffused into said surface layer.

3. A non-linear organic waveguide according to claim 2 wherein the surface layer exhibits incident intensity dependent birefringence.

4. A waveguide according to claim 2 which is in the form of a lamnate, the plastics substrate being an element in the laminate.

5. A waveguide according to claim 4 in which a material which is impermeable to the organic dopant is used to form a layer which defines the depth of the doped layer.

6. A waveguide according to claim 2 in which the plastics substrate comprises a polycarbonate, a polyester, a vinylidene difluoride polymer a polyalkylacrylate or methacrylate or polystyrene.

7. A waveguide according to claim 6 in which the plastics substrate comprises a polymer of diethylene glycol bis(allyl carbonate).

8. A Fabry-Perot resonator which contains within its cavity a waveguide structure as claimed in claim 2.

9. A method of producing an organic waveguide which comprises treating a transparent plastics substrate with a solution of an organic dopant having intrinsically non-linear optical properties in an inert solvent, under conditions such that said dopant diffuses into said substrate and forms a surface layer having a refractive index which is greater than that of the bulk substrate, said dopant having a higher affinity for the plastics substrate than for said solvent.

10. A method according to claim 9 in which the organic dopant is selected from compounds exhibiting large dipole moments.

11. A method according to claim 9 in which the organic dopant is an aryl compound having amino, hydroxy, nitro and/or methoxy substituents.

12. A method according to claim 11 in which the organic dopant is a nitroaniline or a derivative thereof.

13. A method according to claim 9 in which the organic dopant includes a nitrogen-containing heterocyclic ring having aromatic character.

14. A method according to claim 9 in which the solvent is one or more per fluorinated hydrocarbons.

15. A method according to claim 9 which includes the step of masking the surface of the plastics substrate prior to contacting the surface of the substrate with the solution of the dopant, thereby defining a pattern of doped areas in the surface of said substrate.

16. A method according to claim 9 in which the substrate is formed with a metallic mask and an electrical field is applied to areas between sad metallic mask portions during treatment of said substrate with said solution of the organic dopant.

17. A method of producing an organic waveguide which comprises treating a transparent plastics substrate with a solution in an inert organic solvent of an organic dopant having intrinsically non-linear optical properties, under conditions such that said dopant diffuses into said substrate and forms a surface layer having a refractive index which is greater than that of the bulk substrate; said dopant having a low solubility product in said solvent and a high affinity for the substrate without causing the substrate to dissolve or swell.

18. A method according to claim 17 in which the solvent is a high boiling inert solvent which does not swell the plastics substrate.

19. A method according to claim 17 in which the substrate is immersed in a refluxing, substantially saturated solution of the dopant in said solvent.

* * * * *